United States Patent [19]
De Busk

[11] Patent Number: 6,047,491
[45] Date of Patent: Apr. 11, 2000

[54] PORTABLE FISHING POLE STORAGE AND SUPPORTING DEVICE

[76] Inventor: Don Juan De Busk, 3342 S. 750 West, Greensburg, Ind. 47240

[21] Appl. No.: 09/176,847

[22] Filed: Oct. 22, 1998

[51] Int. Cl.⁷ .................................................. A01K 97/10
[52] U.S. Cl. .......................... 43/21.2; 248/512; 224/922; 206/315.11; 206/443
[58] Field of Search .................... 43/21.2, 54.1; 206/315.1, 315.11, 443; 248/512; 224/916, 922; 211/68, 70.8

[56] References Cited

U.S. PATENT DOCUMENTS

| | | | |
|---|---|---|---|
| 3,889,860 | 6/1975 | Lindsey | 224/45 R |
| 4,628,628 | 12/1986 | Burgin et al. | 43/26 |
| 5,137,319 | 8/1992 | Sauder | 294/159 |
| 5,450,688 | 9/1995 | Hall | 43/26 |
| 5,657,883 | 8/1997 | Badia | 211/70.8 |
| 5,836,103 | 11/1998 | Taylor | 43/26 |

*Primary Examiner*—Jack W. Lavinder

[57] ABSTRACT

A fishing utility apparatus is provided including a base plate, at least a pair of upstanding plates mounted on the base plate and a top plate mounted on the upstanding plates. Also included is a plurality of storage openings formed in the apparatus for storing a plurality of rods in a prone orientation. Next provided is a plurality of supporting openings formed in the apparatus for supporting a plurality of rods in an erected orientation.

3 Claims, 3 Drawing Sheets

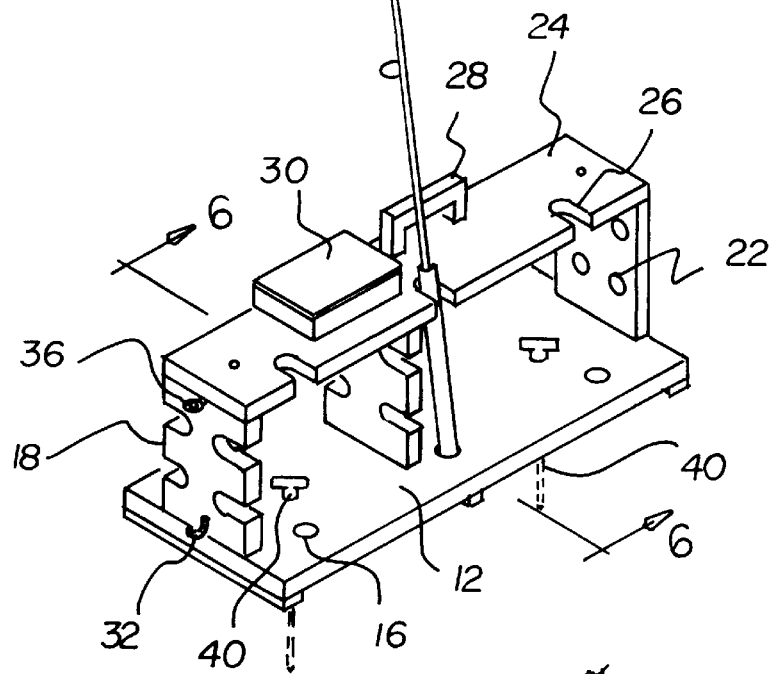
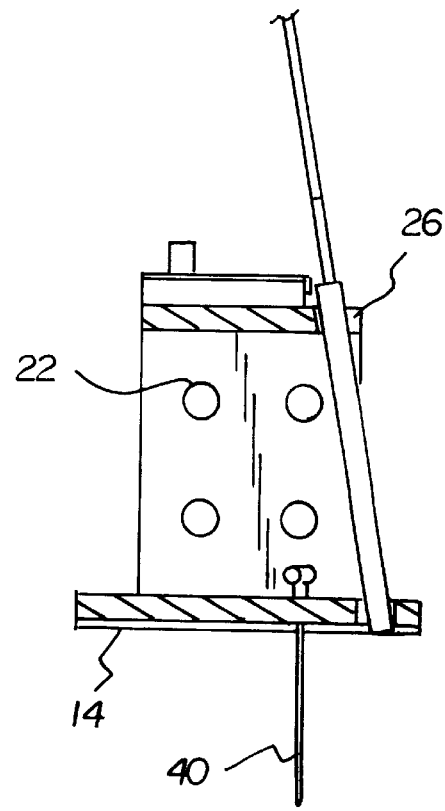

PORTABLE FISHING POLE STORAGE AND SUPPORTING DEVICE

BACKGROUND OF THE INVENTION

1. Field of the Invention

The present invention relates to fishing rod supports and more particularly pertains to a new portable fishing pole storage and supporting device for both storing fishing rods in a stored prone orientation and further supporting the same in an erected orientation during use.

2. Description of the Prior Art

The use of fishing rod supports is known in the prior art. More specifically, fishing rod supports heretofore devised and utilized are known to consist basically of familiar, expected and obvious structural configurations, notwithstanding the myriad of designs encompassed by the crowded prior art which have been developed for the fulfillment of countless objectives and requirements.

Known prior art fishing rod supports include U.S. Patent Nos. 5,450,688; 5,414,953; 4,858,366; 5,025,584; 4,014,128; and 2,934,298.

In these respects, the portable fishing pole storage and supporting device according to the present invention substantially departs from the conventional concepts and designs of the prior art, and in so doing provides an apparatus primarily developed for the purpose of both storing fishing rods in a stored prone orientation and further supporting the same in an erected orientation during use.

SUMMARY OF THE INVENTION

In view of the foregoing disadvantages inherent in the known types of fishing rod supports now present in the prior art, the present invention provides a new portable fishing pole storage and supporting device construction wherein the same can be utilized for both storing fishing rods in a stored prone orientation and further supporting the same in an erected orientation during use.

The general purpose of the present invention, which will be described subsequently in greater detail, is to provide a new portable fishing pole storage and supporting device apparatus and method which has many of the advantages of the fishing rod supports mentioned heretofore and many novel features that result in a new portable fishing pole storage and supporting device which is not anticipated, rendered obvious, suggested, or even implied by any of the prior art fishing rod supports, either alone or in any combination thereof.

To attain this, the present invention generally comprises a base plate having a planar, rectangular configuration. The base plate is equipped with a top face, a bottom face, and a periphery formed therebetween. The periphery of the base plate is defined by a pair of elongated side edges and a pair of short end edges. As shown in FIGS. 1 & 5, the base plate has a pair of thin feet each mounted to the bottom face of the base plate along the side edges thereof. For reasons that will soon become apparent, the base plate has a plurality of linear aligned circular bores formed therein along the side edges thereof. Next provided is a plurality of upstanding plates each with a planar, rectangular configuration. The upstanding plates each have a periphery defined by a short top edge and a short bottom edge. The top and bottom edges of the upstanding plates each have a length less than that of the end edges of the base plate. The periphery of the upstanding plates further include a pair of elongated side edges. As shown in the Figures, the bottom edges of the upstanding plates are mounted to the top face of the base plate such that the upstanding plates remain in a parallel relationship. The upstanding plates preferably include a first end upstanding plate mounted along a central extent of one of the end edges of the base plate. Associated therewith is a second end upstanding plate mounted along a central extent of another one of the end edges of the base plate. Finally, a central upstanding plate is mounted along a center line of the base plate. The first end and central upstanding plates each have a plurality of vertically spaced oval slots formed in the side edges thereof. These oval slots each reside in communication with the corresponding side edge. The second end upstanding plate, on the other hand, has a plurality of vertically spaced circular holes formed adjacent to and spaced from the side edges thereof. Note FIGS. 3 & 4. By this structure rods may be situated within the circular holes and thereafter inserted within the slots for storing the same in a prone parallel orientation. The apparatus of the present invention further includes a top plate with a planar rectangular configuration. Similar to the base plate, the top plate has a periphery defined by a pair of elongated side edges and a pair of short end edges. These short end edges are each mounted along the top edges of the upstanding plates. It should be noted that the end edges of the top plate have lengths equal to that of the top edges of the upstanding plates. As shown in FIGS. 1 & 5, the top plate has a plurality of oval slots formed in the side edges thereof which are in communication with the side edges. The oval slots of the top plate are further each in alignment with one of the circular bores of the base plate. By this structure, bottoms of a plurality of rods may be situated within the circular bores of the base plate while a central extent of the rods reside within the oval slots of the top plate for maintaining the same in an erected, slightly angled orientation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable fishing pole storage and supporting device apparatus and method which has many of the advantages of the fishing rod supports mentioned heretofore and many novel features that result in a new portable fishing pole storage and supporting device which is not anticipated, rendered obvious, suggested, or even implied by any of the prior art fishing rod supports, either alone or in any combination thereof.

It is another object of the present invention to provide a new portable fishing pole storage and supporting device which may be easily and efficiently manufactured and marketed.

It is a further object of the present invention to provide a new portable fishing pole storage and supporting device which is of a durable and reliable construction.

An even further object of the present invention is to provide a new portable fishing pole storage and supporting device which is susceptible of a low cost of manufacture with regard to both materials and labor, and which accordingly is then susceptible of low prices of sale to the consuming public, thereby making such portable fishing pole storage and supporting device economically available to the buying public.

Still yet another object of the present invention is to provide a new portable fishing pole storage and supporting device which provides in the apparatuses and methods of the prior art some of the advantages thereof, while simultaneously overcoming some of the disadvantages normally associated therewith.

Still another object of the present invention is to provide a new portable fishing pole storage and supporting device for both storing fishing rods in a stored prone orientation and further supporting the same in an erected orientation during use.

Even still another object of the present invention is to provide a new portable fishing pole storage and supporting device that includes a base plate, at least a pair of upstanding plates mounted on the base plate and a top plate mounted on the upstanding plates. Also included is a plurality of storage openings formed in the apparatus for storing a plurality of rods in a prone orientation. Next provided is a plurality of supporting openings formed in the apparatus for supporting a plurality of rods in an erected orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a perspective view of the present invention with the poles each in an erected orientation.

FIG. 6 is a side cross-sectional view of the present invention.

DESCRIPTION OF THE PREFERRED EMBODIMENT

Figure 1:
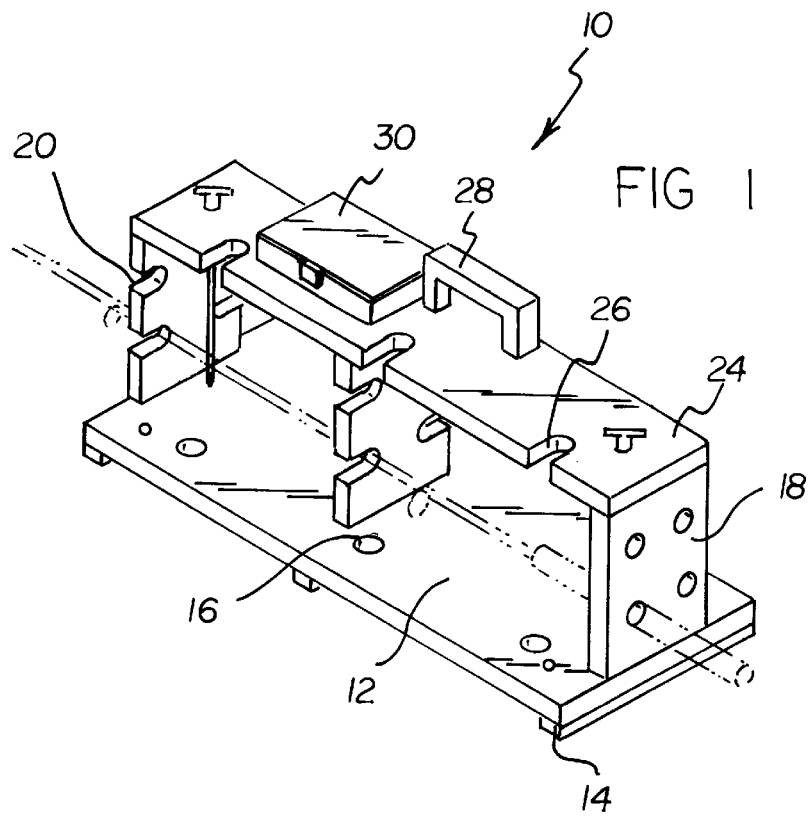
FIG. 1 is a perspective view of the present invention with the poles each in a stored orientation.
Figure 2:
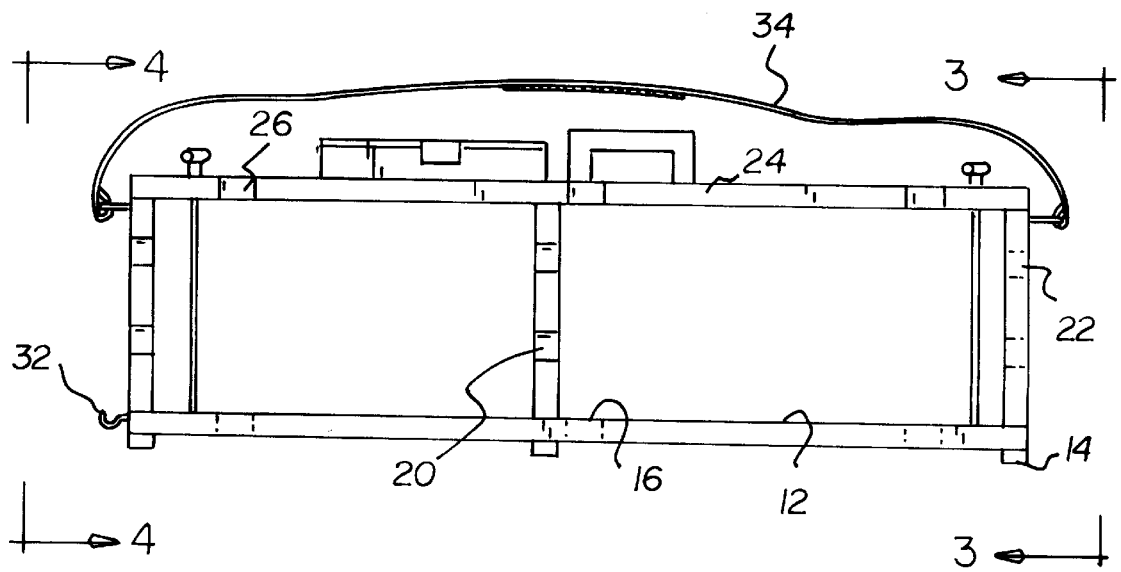
FIG. 2 is a side view of the present invention.
Figure 3:
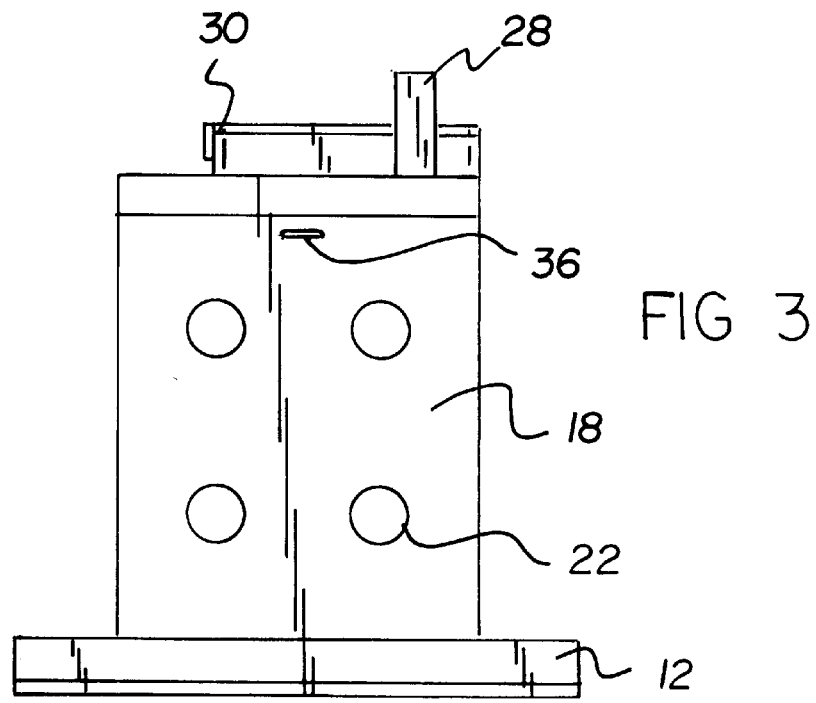
FIG. 3 is an end view of the present invention.

With reference now to the drawings, and in particular to FIGS. 1 through 6 thereof, a new portable fishing pole storage and supporting device embodying the principles and concepts of the present invention and generally designated by the reference numeral 10 will be described.

The present invention, designated as numeral 10, includes a base plate 12 having a planar, rectangular configuration. The base plate is equipped with a top face, a bottom face, and a periphery formed therebetween. The periphery of the base plate is defined by a pair of elongated side edges and a pair of short end edges. As shown in FIGS. 1 & 5, the base plate has a pair of thin feet 14 each mounted to the bottom face of the base plate along the side edges thereof. For reasons that will soon become apparent, the base plate has a plurality of linear aligned circular bores 16 formed therein along the side edges thereof.

Next provided is a plurality of upstanding plates 18 each with a planar, rectangular configuration. The upstanding plates each have a periphery defined by a short top edge and a short bottom edge. The top and bottom edges of the upstanding plates each have a length less than that of the end edges of the base plate. The periphery of the upstanding plates further include a pair of elongated side edges.

As shown in the Figures, the bottom edges of the upstanding plates are mounted to the top face of the base plate such that the upstanding plates remain in a parallel relationship. The upstanding plates preferably include a first end upstanding plate mounted along a central extent of one of the end edges of the base plate. Associated therewith is a second end upstanding plate mounted along a central extent of another one of the end edges of the base plate. Finally, a central upstanding plate is mounted along a center line of the base plate.

The first end and central upstanding plates each have a plurality of vertically spaced oval slots 20 formed in the side edges thereof. These oval slots each reside in communication with the corresponding side edge. The second end upstanding plate, on the other hand, has a plurality of vertically spaced circular holes 22 formed adjacent to and spaced from the side edges thereof. Note FIGS. 3 & 4. By this structure, rods may be situated within the circular holes and thereafter inserted within the slots of the upstanding plates for storing the same in a prone parallel orientation.

The apparatus of the present invention further includes a top plate 24 with a planar rectangular configuration. Similar to the base plate, the top plate has a periphery defined by a pair of elongated side edges and a pair of short end edges. These short end edges are each mounted along the top edges of the upstanding plates. It should be noted that the end edges of the top plate have lengths equal to that of the top edges of the upstanding plates.

As shown in FIGS. 1 & 5, the top plate has a plurality of oval slots 26 formed in the side edges thereof which are each in communication with the associated side edge. The oval slots of the top plate are each further in alignment with one of the circular bores of the base plate. By this structure, bottoms of a plurality of rods may be situated within the circular bores of the base plate while a central extent of the rods reside within the oval slots of the top plate for maintaining the same in an erected, slightly angled orientation. Note FIG. 5. In the preferred embodiment, the oval slots are beveled, as shown in FIG. 6.

The top plate further has an inverted U-shaped handle 28 mounted to a central extent thereof adjacent to one of the side edges thereof for carrying purposes. Also mounted on the top plate is a tackle box 30 with a lockable lid pivotally secured thereon for housing fishing tackle. A lantern hook 32 is coupled to a central extent of one of the end edges of the base plate for hanging a lantern thereon when the apparatus is being carried.

For carrying the apparatus on a shoulder of a user, a flexible shoulder strap 34 has a pair of ends removably mounted to central extents of the end edges of the top plate. Such removable coupling may be effected by a pair of hooks 36 mounted on the apparatus and holes formed in the strap or any other means.

Figure 4:
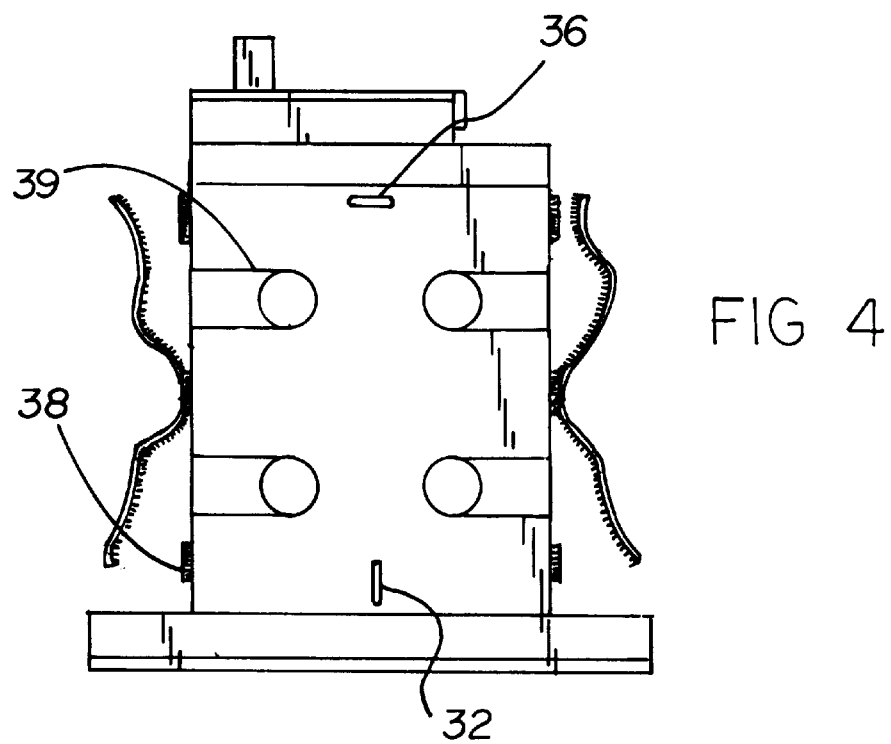
FIG. 4 is another end view of the present invention showing the pile fasteners thereof.

FIG. 4 shows a plurality of short pile fasteners 38 mounted on the side edges of each of the first end and central upstanding plates. Also shown is an elongated pile fastener 39 having a central extent mounted to a center of the side edges of the first end and central upstanding plates. The elongated pile fastener serves for being releasably secured along the side edge of the corresponding upstanding plate by way of a coupling with the short pile fasteners. By this structure, the rods situated within the holes and slots of the upstanding plates may be secured therein for storage and transporting purposes.

Finally, a pair of stakes 40 are provided each having a top end with a T-shaped handle mounted thereon and a sharpened bottom end. The stakes, in a first orientation, are each removably extended through apertures formed in the base plate and into a recipient surface, namely the ground. In a second orientation, the stakes are situated through apertures formed in the top plate and the apertures of the base plate for storage purposes.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A fishing utility apparatus comprising, in combination:
   a base plate having a planar, rectangular configuration with a top face, a bottom face, and a periphery formed therebetween defined by a pair of elongated side edges and a pair of short end edges, the base plate having a pair of thin feet each mounted to the bottom face of the base plate along the side edges thereof, wherein the base plate has a plurality of linear aligned circular bores formed therein along the side edges thereof;
   a plurality of upstanding plates each with a planar, rectangular configuration and having a periphery defined by a short top edge and a short bottom edge each with a length less than that of the end edges of the base plate and a pair of elongated side edges, wherein the bottom edges of the upstanding plates are mounted to the top face of the base plate such that the upstanding plates remain in a parallel relationship, the upstanding plates including a first end upstanding plate mounted along a central extent of one of the end edges of the base plate, a second end upstanding plate mounted along a central extent of another one of the end edges of the base plate, and a central upstanding plate mounted along a center line of the base plate, wherein the first end and central upstanding plates each have a plurality of vertically spaced oval slots formed in the side edges thereof which each reside in communication with the corresponding side edge, wherein the second end upstanding plate has a plurality of vertically spaced circular holes formed adjacent to and spaced from the side edges thereof;
   a top plate with a planar rectangular configuration having a periphery defined by a pair of elongated side edges and a pair of short end edges each mounted along the top edges of the upstanding plates, wherein the end edges of the top plate have lengths equal to that of the top edges of the upstanding plates, the top plate having a plurality of oval slots formed in the side edges thereof which are in communication with the side edges and each in alignment with one of the circular bores of the base plate, the top plate further having an inverted U-shaped handle mounted to a central extent thereof adjacent to one of the side edges thereof;
   a tackle box mounted on the top plate with a lockable lid pivotally secured thereon for housing fishing tackle;
   a lantern hook coupled to a central extent of one of the end edges of the base plate for hanging a lantern thereon;
   a flexible shoulder strap having a pair of ends removably mounted to central extents of the end edges of the top plate for carrying the apparatus on a shoulder of a user;
   a plurality of short pile fasteners mounted on the side edges of each of the first end and central upstanding plates and an elongated pile fastener mounted to the side edges of the first end and central upstanding plates for being releasably secured along the side edge of the corresponding upstanding plate by way of a coupling with the short pile fasteners, wherein rods situated within the holes and slots of the upstanding plates may be secured therein; and
   a pair of stakes each with a top end with a T-shaped handle mounted thereon and a sharpened bottom end, the stakes, in a first orientation, each removably extended through apertures formed in the base plate and into a recipient surface and, in a second orientation, extending through apertures formed in the top plate and the apertures of the base plate for storage purposes.

2. A fishing utility apparatus comprising, in combination:
   a base plate having a planar, rectangular configuration with a top face, a bottom face, and a periphery formed therebetween defined by a pair of elongated side edges and a pair of short end edges, the base plate having a pair of thin feet each mounted to the bottom face of the base plate along the side edges thereof, wherein the base plate has a plurality of linear aligned circular bores formed therein along the side edges thereof;

three upstanding plates each having a short top edge and a short bottom edge each with a length less than that of the end edges of the base plate and a pair of elongated side edges, wherein the bottom edges of the upstanding plates are mounted to the top face of the base plate, the upstanding plates including a first end upstanding plate mounted along a central extent of one of the end edges of the base plate, a second end upstanding plate mounted along a central extent of another one of the end edges of the base plate, and a central upstanding plate mounted along a center line of the base plate, wherein the first end and central upstanding plates each have a plurality of vertically spaced oval slots formed in the side edges thereof which each reside in communication with the corresponding side edge, wherein the second end upstanding plate has a plurality of vertically spaced circular holes formed adjacent to and spaced from the side edges thereof;

a top plate with a planar rectangular configuration having a pair of elongated side edges and a pair of short end edges each mounted along the top edges of the upstanding plates, wherein the end edges of the top plate have lengths equal to that of the top edges of the upstanding plates, the top plate having a plurality of oval slots formed in the side edges thereof which are in communication with the side edges and each in alignment with one of the circular bores of the base plate;

a tackle box mounted on the top plate for housing fishing tackle;

a lantern hook coupled to a central extent of one of the end edges of the base plate for hanging a lantern thereon;

a flexible shoulder strap having a pair of ends removably mounted to central extents of the end edges of the top plate for carrying the apparatus on a shoulder of a user;

a plurality of short pile fasteners mounted on the side edges of each of the first end and central upstanding plates and an elongated pile fastener mounted to the side edges of the first end and central upstanding plates for being releasably secured along the side edge of the corresponding upstanding plate by way of a coupling with the short pile fasteners, wherein rods situated within the holes and slots of the upstanding plates may be secured therein; and at least one stake with a top end with a T-shaped handle mounted thereon and a sharpened bottom end, the stake removably extended through apertures formed in the base plate and into a recipient surface.

3. A fishing utility apparatus as set forth in claim, 2 wherein the top plate includes a handle.

\* \* \* \* \*